United States Patent [19]

Smith

[11] 4,366,306

[45] Dec. 28, 1982

[54] MELT POLYMERIZATION OF ε-CAPROLACTAM

[75] Inventor: Harry A. Smith, Midland, Mich.

[73] Assignee: The Dow Chemical Company, Midland, Mich.

[21] Appl. No.: 202,022

[22] Filed: Oct. 29, 1980

Related U.S. Application Data

[63] Continuation-in-part of Ser. No. 117,734, Feb. 1, 1980, abandoned, which is a continuation-in-part of Ser. No. 17,530, Mar. 5, 1979, abandoned.

[51] Int. Cl.$^3$ ............................................. C08G 69/16
[52] U.S. Cl. .................................... 528/315; 528/313; 528/323; 528/481; 528/483
[58] Field of Search ............... 528/315, 313, 323, 481, 528/483

[56] References Cited

U.S. PATENT DOCUMENTS

| | | | |
|---|---|---|---|
| 2,241,322 | 5/1941 | Hanford | 528/323 |
| 2,264,293 | 12/1941 | Brubaker | 528/323 |
| 2,374,145 | 4/1945 | Taylor | 528/313 |
| 2,524,228 | 10/1950 | Kropa et al. | 528/328 |
| 2,526,078 | 10/1950 | Kropa et al. | 528/323 |
| 2,585,199 | 2/1952 | Watson | 528/314 |
| 3,037,002 | 5/1962 | Pietrusza et al. | 528/328 |
| 3,366,608 | 1/1968 | Lincoln et al. | 528/323 |
| 3,555,114 | 1/1971 | Reimscheussel et al. | 528/323 |
| 3,711,447 | 1/1973 | Fester et al. | 528/323 |

FOREIGN PATENT DOCUMENTS

| | | |
|---|---|---|
| 856312 | 12/1977 | Belgium . |
| 535421 | 4/1941 | United Kingdom . |
| 1222803 | 2/1971 | United Kingdom . |
| 1238868 | 7/1971 | United Kingdom . |
| 1532603 | 11/1978 | United Kingdom . |

*Primary Examiner*—Harold D. Anderson
*Attorney, Agent, or Firm*—R. B. Ingraham

[57] ABSTRACT

ε-Caprolactam is melt polymerized in the presence of water and from about 0.01 mole percent to less than about 0.6 mole percent of an amine boiling at a temperature greater than 245° C. An amine may be a primary or secondary amine wherein the NH has attached thereto, for example alkyl radicals, cycloalkyl radicals, and the like. The resultant polymer has a methanol extractable content of 3 weight percent or less.

7 Claims, No Drawings

MELT POLYMERIZATION OF ε-CAPROLACTAM

This is a continuation-in-part of Ser. No. 117,734, filed Feb. 1, 1980, which is a continuation-in-part of Ser. No. 17,530, filed Mar. 5, 1979, both now abandoned.

Melt polymerization of ε-caprolactam in the presence of water is well known and has been used commercially for many years. Such a polymerization generally is carried out at temperatures from about 180° to 300° C. in the presence of from about 0.05 to ten moles of water per mole of lactam. Generally, the polymerization is initially carried out in a closed system under superatmospheric pressure until a major portion of the monomer has been converted to polymer, the reactor is then opened and water permitted to distill under atmospheric or subatmospheric pressure. The polymerization mixture reaches an equilibrium wherein it contains from about 10 to 12 weight percent methanol extractable material which consists of unreacted caprolactam and oligomers of caprolactam. It is necessary usually to remove the oligomers and unreacted monomer by extraction, vaporization or like procedures. The presence of such monomers and oligomers often is undesirable in the processing of the polycaprolactam into fibers, films or other shaped articles.

In a previously filed method application, Ser. No. 702,812 filed July 6, 1976, published as Belgian Pat. No. 856,312, a variety of amines were employed in the polymerization of ε-caprolactam to reduce the residual caprolactam and oligomer. Such amines were employed at a level of from about 0.6 mole percent to 5 mole percent based on the initially present amount of caprolactam.

It would be desirable if there were available a method for the polymerization of caprolactam into a linear polyamide wherein low levels of methanol extractable could be obtained employing minimal quantities of additives.

It would also be desirable if there were available an improved method for the polymerization of ε-caprolactam wherein a high proportion of the monomeric material is converted to a linear polymer.

It would also be desirable if such an improved method provided a polymer which could be spun without extraction.

These benefits and other achievements in accordance with the present invention are achieved in a process for the preparation of linear polyamide from ε-caprolactam, the method comprising heating an initially present polymerizable polyamide forming ε-caprolactam composition to a temperature from about 180° to 300° C. in the presence of about 0.05 to 10 mole of water per mole of initially present composition, to convert at least a major portion of the composition to polymer while under superatmospheric pressure, removing water from the polymer at a pressure not greater than about atmospheric pressure, maintaining the polymer under an inert atmosphere and subsequently cooling the polymer to provide solidified polymer having polymerized therein ε-caprolactam, the improvement which comprises providing in the polymerizing composition before a majority of the polymerization has occurred from about 0.01 to less than about 0.6 mole percent based on the initially present composition of primary or secondary amines or mixtures thereof which boil under atmospheric pressure at temperatures not less than about 245° C. of the Formula (I):

wherein $R_1$ and $R_2$ are individually selected from the group consisting of hydrogen, alkyl radicals, cycloalkyl radicals, cyclooxyamidoalkyl radicals, amidoalkyl radicals, aromatic radicals, aralkyl radicals, alkyl sulfonate radicals, alkyl sulfide, alkaryl radicals, such radicals containing up to 18 carbon atoms, where $R_1$ and $R_2$ together are collectively considered. $R_1$ and $R_2$ together represent a divalent alkylene radical and after removing water maintaining the polymer at a temperature of from 240° to 280° Centigrade for a period of from about 6 to 12 hours while contacting the polymer with an inert gas at a rate of from about 5 to 300 cubic centimeters per minute of a gas at standard temperature and pressure per 300 grams of polymer to thereby obtain a polyamide containing less than about 3 weight percent methanol extractable.

Suitable inert atmospheres include nitrogen, helium, argon, carbon dioxide and the like. The inert atmosphere beneficially may be applied to the polymer by any of the techniques well known to those skilled in the art. Such techniques may vary from simply passing the inert gas over the surface of the heated polymer contained in a vessel to the use of complex evaporators or devolatilizers in thin film evaporators, falling film evaporators, falling strand evaporators, the use of perforated pipe or perforated plate distributors and the like. The quantity of inert gas employed per 300 grams of polymer advantageously is within the range of from about 5 to 300 cubic centimeters (at standard temperature and pressure) per 300 grams of polymer, the gas being applied to the polymer for a period of from about 6 to 12 hours and advantageously for a period of from about 7 to 9 hours. The quantity of inert gas employed will vary with the technique utilized to apply the gas to the polymer. By way of illustration, if polymer weighing about 300 grams is held in an unagitated vessel wherein the polymer has 12.5 square inches of surface exposed to the inert gas, a flow rate of from about 50 to about 150 cubic centimeters is advantageously employed. In the event that the inert gas is passed upwardly through the molten polymer in such a vessel, a flow rate of from about 10 to 30 cubic centimeters is employed.

The methanol extractable value of polyamide polymers is determined in the following manner: 2 grams of polymer which are passed through a 20-mesh U.S. sieve size screen are extracted in boiling methanol for 90 minutes. The mixture is cooled and filtered. The filtrate is evaporated on a steam bath under pressure of 10 millimeters of mercury absolute for 15 minuts after any visible liquid has disappeared. The container with the residue is then dried for 10 minutes at 110° C. in a circulating air oven. Container and residue are placed in a desiccator and allowed to cool to room temperature and weighed. The weight percent of extractables is then calculated.

The amine may be a free amine or in the form of an amine salt of an organic or inorganic acid as such salts disassociate when subjected to polymerization conditions. Generally, the amine is added prior to heating the polymerizable composition to polymerizing temperature. However, it may be added after a minor amount of conversion of the lactam to polymer has occurred. In most cases it is preferred to add the amine prior to initiating polymerization.

The polymerizable ε-caprolactam compositions useful in the practice of the present invention may have as the polymerizable component only ε-caprolactam, or if desired may contain in admixture therewith other linear polyamide forming materials; for example, equimolar quantities of hexamethylene diamine and adipic acid and like well known polyamide forming materials.

The melt polymerization of ε-caprolactam is well known and is described in U.S. Pat. No. 2,241,322 which also discloses the use of a variety of compounds for the so-called stabilization of the polymers. Amines are disclosed as suitable for such stabilization, and it is also stated that such compounds serve no apparent catalytic purpose in promoting the polymerization reaction when used according to the disclosed process. A similar teaching is found in U.S. Pat. No. 2,264,293. Such polymerization is also disclosed in U.S. Pat. Nos. 2,374,145 and 2,585,199, the teachings of which are herewith incorporated by reference. U.S. Pat. No. 2,524,228 discloses that complete conversion to polymer is not obtained. Some of these references also disclose, as stabilizers, N-amino alkyl morpholines and aminophenoxyacetic acid. U.S. Pat. No. 3,555,114 discloses nonvented polymerization in the presence of various amines including diethanol amine.

a temperature of 250° C. for a period of 12 hours. Pressure in the reactor was about 45 pounds per square inch gauge. At the end of the 12-hour period, the reactor was cooled and a grayish paste obtained which was 6.8 weight percent ε-caprolactam, 18.1 weight percent morpholine. The remainder being crude N-(6-aminohexanoyl) morpholine which was used without further purification.

EXAMPLE 1

A 2-liter Parr bomb equipped with agitator and a nitrogen purge line was charged with 339 grams of ε-caprolactam and 4.9 grams of water and with varying amounts of acetic acid and N-(6-aminohexyanoyl) morpholine. The reactor was closed and heated to 250° C. for 12 hours at which time the reactor was vented and a stream of nitrogen passed into the reactor for a period of 10 hours during which the temperature was maintained at 250° C. The resultant polymer was analyzed for weight percent ε-caprolactam by gas phase chromatography. The methanol extractable was determined as hereinbefore set forth and the relative viscosity of the polymer was determined by measuring the viscosity of 96 percent sulfuric acid containing 1 gram of polymer to 182.5 grams of sulfuric acid at 25° C., and the viscosity of the acid without polymer. The relative viscosity is the viscosity of the acid plus polymer divided by the viscosity of the acid.

TABLE I

| Weight % Adduct | Weight % Acetic Acid | Mole Ratio Adduct/Caprolactam | % Caprolactam | % Methanol Extractable | % Un-extractable | Relative Viscosity |
|---|---|---|---|---|---|---|
| 1.51 | 0.29 | 1/150 | 0 | 0.68–1.00 | 99.0–99.5 | 2.51–2.60 |
| 1.32 | 0.15 | 1/172 | 0 | 1.00 | 99.0 | 2.88 |
| 0.46 | 0.26 | 1/500 | 0.58 | 1.35–1.50 | 98.5 | 3.34 |
| 0.12 | 0.32 | 1/2000 | 0.09 | 1.00 | 99.0 | 2.92 |
| 0.02 | 0.32 | 1/10,000 | 0 | 1.38–1.68 | 98.5 | 2.53 |
| 0 | 0.32 | — | 0 | 3.5 | 97.0 | 2.69 |
| 0 | 0.32 | — | 0 | 4.0–4.5 | 95.5–96.0 | 2.43 |
| 0 | 0.32 | — | 0 | 4.0 | 96.5 | 2.59 |
| 0 | 0.32 | — | 0 | 4.0 | 96.0 | 2.60 |

The present invention is further illustrated but not limited by the following examples in which unless otherwise specified percentage and parts refer to weight percent and parts by weight unless otherwise specified.

A 2-liter agitated Parr bomb was charged with 565 grams, 5 moles of ε-caprolactam, 9 grams water, 435 grams, 5 moles of morpholine. The mole ratio of water to ε-caprolactam was 1:1.3. The mixture was heated to

EXAMPLE 2

The procedure of Example 1 was repeated for the data of Table IIA and with the exception that no acetic acid was employed and varying amines were used to replace N-(6-aminohexanoyl) morpholine for the data of Table II. Results are set forth in Table II and Table II-A.

TABLE II

| Amine | Weight % Amine | Boiling Point | Weight Acetic Acid | Mole Ratio Amine/Caprolactam | Mole % | % Caprolactam | % CH₃OH Extractable | % Unextractable | Relative Viscosity |
|---|---|---|---|---|---|---|---|---|---|
| Aminoethyl Octyl Sulfide (63–70) | 0.17 | 310° C.–315° C. | 0.32 | 1/1000 | 0.10 | 0.71 | 1.50 | 98.0 | 2.58 |
| Octyldecyl Amine (62–72) | 0.25 | 340° C.–345° C. | 0.32 | 1/1000 | 0.10 | 0 | 1.50 | 98.5 | 2.71 |
| Dicyclohexyl Amine (63–73) | 0.16 | 256° C. | 0.32 | 1/1000 | 0.10 | 0 | 1.00 | 99.0 | 2.78 |

TABLE II-A

| Inhibitor (Boiling Point) | Mole % | Weight % | RESIN ANALYSIS | | | |
|---|---|---|---|---|---|---|
| | | | % Caprolactam | % Extractables | % Non-Extractables | Relative Viscosity |
| Morpholine ε-Caprolactam (>300° C.) | 0.05 | 0.12 | 0.09 | 1.00 | 99.0 | 2.9 |
| Diphenyl Amine (302° C.) | 0.10 | 0.15 | 0.19 | 2.00 | 98.0 | 2.95 |
| Taurine (H$_2$NCH$_2$CH$_2$SO$_3$H) (>325° C.) | 0.10 | 0.11 | 0.32 | 1.50 | 98.5 | 2.7 |

In the foregoing examples, the nitrogen stream was at a volume of from about 50 to 150 cubic centimeters per minute.

In a manner similar to the foregoing illustrations polymerized ε-caprolactam is readily prepared which has a low oligomer content and a low ε-caprolactam content employing amines having the hereinbefore described characteristics including dibenzylamine.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the preparation of linear polyamide from ε-caprolactam, the steps of the method comprising heating an initially present polymerizable polyamide forming ε-caprolactam composition to a temperature from about 180° to 300° C. in the presence of about 0.5 to 10 mole of water per mole of initially present composition, to convert at least a major portion of the composition to polymer while under superatmospheric pressure, removing water from a polymer at a pressure not greater than about atmospheric pressure, maintaining the polymer under an inert atmosphere and subsequently cooling the polymer to provide solidified polymer having polymerized therein ε-caprolactam, the improvement which comprises providing in the polymerizing composition before a majority of the polymerization has occurred from about 0.01 to less than about 0.6 mole percent based on the initially present composition of primary and secondary amines or mixtures thereof which boil under atmospheric pressure at temperatures not less than about 245° C. of the Formula (I):

where R$_1$ and R$_2$ are individually selected from the group consisting of hydrogen, alkyl radicals, cycloalkyl radicals, cyclooxyamidoalkyl radicals, amidoalkyl radicals, aromatic radicals, aralkyl radicals, alkyl sulfonate radicals, alkyl sulfide, alkaryl radicals, such radicals containing up to 18 carbon atoms, where R$_1$ and R$_2$ together are collectively considered, R$_1$ and R$_2$ together represent a divalent alkylene radical and after removing water, maintaining the polymer at a temperature of from 240° to 280° Centigrade for a period of from about 6 to 12 hours while contacting the polymer with an inert gas at a rate of from about 5 to 300 cubic centimeters per minute of a gas at standard temperature and pressure per 300 grams of polymer to thereby obtain a polyamide containing less than about 3 weight percent methanol extractable.

2. The process of claim 1 wherein the amine is N-(6-aminohexanoyl)morpholine.

3. The process of claim 1 wherein the amine is an aminoethyloctyl sulfide.

4. The process of claim 1 wherein the amine is an octyldecylamine.

5. The process of claim 1 wherein the amine is a dicyclohexylamine.

6. The process of claim 1 wherein the amine is a diphenylamine.

7. The process of claim 1 wherein the amine is a taurine.

* * * * *

UNITED STATES PATENT AND TRADEMARK OFFICE
CERTIFICATE OF CORRECTION

PATENT NO. : 4,366,306

DATED : Dec. 28, 1982

INVENTOR(S) : Harry A. Smith

It is certified that error appears in the above—identified patent and that said Letters Patent is hereby corrected as shown below:

```
In column 2, line 56, "minuts" should read --minute--.
In column 5, line 36, "of about 0.5" should read --of
              about 0.05--;
              line 40, "from a polymer" should read
              --from the polymer--.
```

Signed and Sealed this

Nineteenth Day of April 1983

[SEAL]

Attest:

GERALD J. MOSSINGHOFF

Attesting Officer

Commissioner of Patents and Trademarks